Dec. 30, 1958 W. E. SCHALL 2,866,369
WIRE STRIPPING MACHINE
Filed July 30, 1956 3 Sheets-Sheet 1

INVENTOR.
WILLIAM EUGENE SCHALL,
BY
Harry E. Westlake Jr
AGENT.

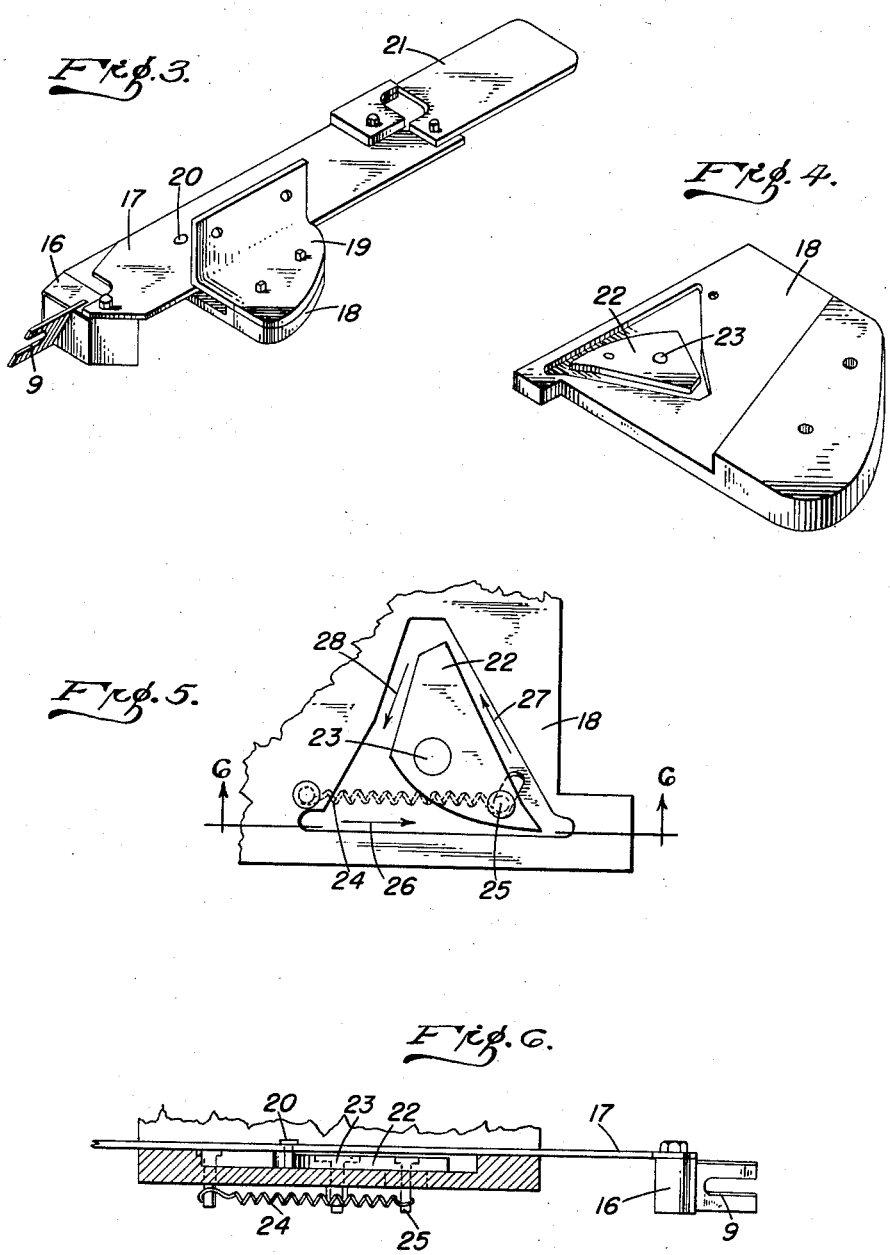

Dec. 30, 1958 W. E. SCHALL 2,866,369
WIRE STRIPPING MACHINE
Filed July 30, 1956 3 Sheets-Sheet 3
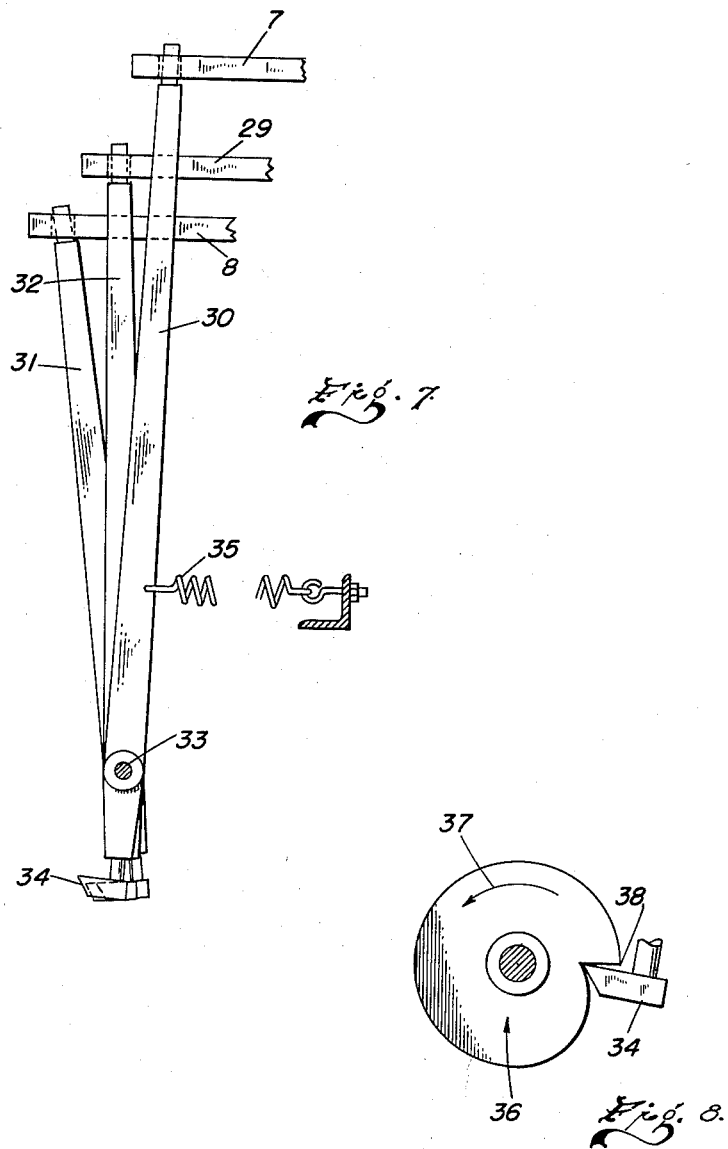
INVENTOR.
WILLIAM EUGENE SCHALL,
BY
Harry E. Westlake Jr
AGENT.

United States Patent Office

2,866,369
Patented Dec. 30, 1958

2,866,369

WIRE STRIPPING MACHINE

William Eugene Schall, Latrobe, Pa., assignor to American Cyanamid Company, New York, N. Y., a corporation of Maine Application July 30, 1956, Serial No. 600,854

4 Claims. (Cl. 81—9.51)

This invention relates to a machine for cutting insulated wire into measured lengths and simultaneously stripping the insulation from the ends of said lengths.

In many fields of the electrical industry and of industries using electrical equipment there is a need for pieces of insulated electrical wire of definite length, from the ends of which the insulation has been stripped in order to permit electrical connections. Such a need arises in such industries as those making electrical appliances, radios, and similar devices. Allied industries sometimes also need such strips of wire for specialty uses. An example of these is the fuse wire for electric blasting caps.

There have been in the past various proposals for machines which would automatically strip and/or cut lengths of electrical wire. Some of these machines depended on the action of rollers which crushed specific lengths of the insulation at intervals, followed by wire brushes which abraded away from the wire the crushed part of the insulation. The wire was then cut at a later stage at the points where the insulation had been removed. Because there are many kinds of insulation used, this method is not too satisfactory and dependable a way of removing insulation. Some kinds of insulation such as molded rubber reinforced with fibers cannot be stripped adequately in this manner.

Another proposal in the past has been a machine in which the wire to be stripped was caught in a mechanism which rotated it over a set of cutting wheels, thus piercing the insulation at stated intervals. The stripping of the insulation from the wire in this method depended on a further longitudinal cut between two lateral cuts and the effect of the rotation to remove the cut insulation. Such an operation has a tendency to cut the wires as well as the insulation when the wire is rotated on the cutting wheel or, in the alternative method, when cutting wheels are rotated near the wire. Furthermore, here again, the cutting of the wire into lengths had to be a separate operation of the machine or of another machine.

Another suggested method has tried to eliminate some of these disadvantages by doing the cutting and stripping in one place by three separate pairs of knives. This method used two pairs of knives for stripping and one pair to cut. An arm pulled a length of wire into place and the two pairs of stripping knives closed on the wire. The pair of cutting knives then cut the wire between the two pairs of stripping knives. The arm then pulled the cut length of wire through one pair of stripping knives, stripping the insulation from its end and ejecting it. The arm then had to reciprocate back to the main length of wire and pull the latter in a reverse direction in order to strip the other cut end. It has then again to reverse its direction to pull another length of wire into place to repeat the operation. Thus, in order to get the stripping and the cutting operation in one place, it was necessary to go through a number of extra motions including a reversal of the continuous motion in one direction of the main source of the wire, taking extra time as well as extra motion. In addition, the clamp had to exert enough pressure on the wire to grip it firmly. However, such pressure produced a danger that the insulation might be damaged by such a gripping. If the grip were too loose, the wire might slip through the clamp and this slipping also endangered the insulation.

A number of other stripping devices have been reported in the older art which needed manual operation or manual feed of the wire to be stripped. The use of a manual step, essential in the operation, is obviously, in the present state of technology, a distinct disadvantage and adds to the labor cost.

The methods in the prior art have a common disadvantage in that there is no provision for winding or otherwise packaging the cut end stripped lengths of wire. In many cases this is important since otherwise in succeeding operations it is necessary to deal with unwieldly lengths of wire. This is especially true when one considers electric blasting cap fuse wires. In such a case one is dealing not with short strips measured by a matter of several inches but rather with quite a number of feet of wire. It is necessary that before using these wires in the construction of electric blasting caps the lengths be coiled or otherwise packaged in order to facilitate handling. In the past it has been customary with the electric blasting cap fuse wires to wind them into hanks and cut the hanks apart. As a separate operation it was then necessary to strip the insulation from the ends of the hanks by hand.

Another disadvantage encountered in many of the prior art devices is the fact that multiplexed wires were unusable in the machines described. It has become increasingly customary to use twinned or even more greatly multiplexed wires having a common insulation in order to keep the necessary strands in a neat package. For example, there have been described many kinds of plastic insulated wires in which two wires are continuously coated with a plastic insulation to form a twinned or duplex wire, composed of two strands of wire in a single insulation. In the electric blasting cap field these are especially useful since they reduce the number of wires which need to be handled in constructing the blasting caps. Without a duplexed wire it would be necessary to handle two separate hanks of wire in order to get a circuit in the blasting cap.

My invention provides a relatively simple method to achieve the cutting of insulated wire into predetermined lengths, the stripping of the insulation from the ends of those lengths, and the packaging of these lengths into convenient hanks; a method which is usable with multiplexed wire as well as with single wire; and a method which is completely automatic requiring no hand operations.

My invention will be better understood with reference to the accompanying drawings in which:

Fig. 3 is perspective view of the assembled stripping arm which strips the end of the wire still unsevered from the main wire source;

Fig. 4 is perspective view of the cam case and cam in that stripping arm;

Fig. 5 is a top view of a part of the cam case showing the cam in place and the direction of movement of the cam follower;

Fig. 6 is a sectional side view of the upper stripping arm along the line 6—6 of Fig. 5 showing the cam and the cam follower in place;

Fig. 7 is a side view of the reciprocating arms which carry the cutting and stripping knives, with one cam follower of the actuating means shown in place; and Fig. 8 is a side view of one of the sets of cams and cam followers which form the actuating means for the reciprocating arms.

Figures 1, 2:
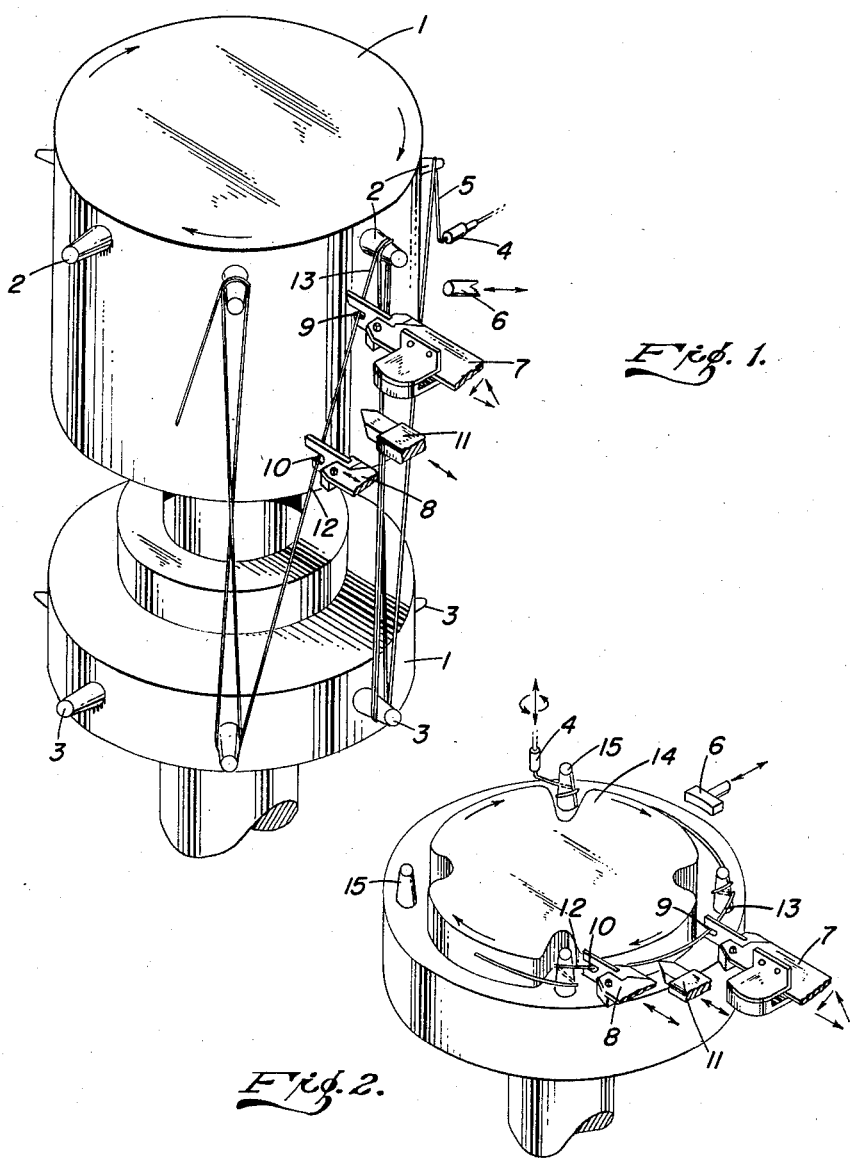
Fig. 1 is a perspective view of an embodiment of my invention in which the hanks or loops of wire are wound on two spindles in order to achieve longer lengths of wire.
Fig. 2 is perspective view of another embodiment of my invention in which each length of wire is coiled on one spindle, an embodiment best adaptable to the production of short lengths.

In reference to these figures, in more detail:

In Fig. 1 a drum 1 is mounted and connected to means (not shown) for rotating said drum intermittently. Such an intermittent rotating means may be any such known to the art such as a proper arrangement of cam-actuated gears or an arrangement of eccentrically toothed gears, fixed to rotate the drum in synchronism with the timing of the cutting and stripping mechanism to be described. At the top of the drum are top spindles 2 evenly spaced around the drum while a similar set of bottom spindles 3 are affixed on a flange on the shaft to which the drum is mounted. A coil of wire (not shown) feeds wire into a shuttle needle 4 which is making a continuous figure-eight motion around the upper and lower spindles, actuated by a conventional driving means (not shown), feeding the wire 5 onto the spindles. After a predetermined number of loops have been coiled, the drum is rotated through a small arc to present another pair of spindles to the shuttle arm. This rotation occurs during the motion of the shuttle from one spindle to the other. There is, thus, no break in the motion of the shuttle needle 4. While the next hank is being wound onto the new set of spindles a knurling tool 6 is actuated by a solenoid (not shown) to hit the strip of insulated wire connecting the previously wound hank with the hank now being wound. The knurling tool 6 strikes the wire against the drum 1 and thus achieves two purposes. First, it helps to loosen the insulation where it is to be stripped and, secondly, it puts into the wire, under the insulation, a series of knurls or crimps which will assist in bonding the wire to the cast plug of an electric blasting cap. The knurling tool 6 is not needed where such bonding will not be required. When the shuttle needle 4 has again completed the required number of loops the drum 1 again rotates presenting the knurled length of wire connecting the two previously wound hanks to a new set of mechanisms a short arc further around the drum. This consists of an upper stripping arm 7 and a lower stripping arm 8, each terminating in a notched knife, respectively 9 and 10. There arms are connected with a reciprocating means, shown in Figs. 7 and 8 and discussed later, permitting them to move toward and away from the drum. They are affixed so that the notched knives 9 and 10 will engage the length of wire connecting the two hanks, and the notches are of just the proper size that the wires will fit through them but not the insulation around the wires. When the two stripping arms have moved into place and thus engaged the wire, they form small cuts in the insulation. A cutting knife 11 at the end of a cutting arm 29 then strikes the wire against the drum approximately halfway between the stripping knives. This severs the connection between the two hanks. The severed end 12 of the now free hank is then pulled through the lower cutting knife 10 by the next rotation of the drum, thus stripping the insulation therefrom. At the same time, because of a cam actuated means to be described in more detail in another figure, the stripping arm nearest the winding mechanism, while retiring from the drum, is forced to make a sweeping lateral motion in the same direction as the rotation of the drum. This motion strips the insulation from the end 13 of the hank which is still connected to the rest of the wire. All three arms are then withdrawn and the rotation of the drum presents a new connecting strip of wire to be severed and stripped.

In Fig. 3 the assembled upper stripping arm which is one of the important novel features of my invention is shown. The notched knife 9 is fastened to a knife holder 16 at such an angle that it will be perpendicular to the wire which it must engage. The knife holder 16 is in turn fastened to a holder arm 17 which slides in a cam case 18 and cam case cover 19. A cam follower 20 engages the cam which is shown in Figs. 4 and 5. The rear of the stripping arm terminates in a means 21 for fastening the arm to the ocnventional reciprocating mechanism shown in Figs. 7 and 8.

In Figs. 4 and 5 the details of the cam 22 and its position in the cam case 18 are shown. The cam rotates on a pivot 23. The cam is held in place by a spring 24 fastened to the cam by a bolt 25. The cam follower 20 moves along the line of arrow 26 when the stripping knife moves in to engage the wire. Then, as the stripping knife is withdrawn, the cam follower, unable to return in the same direction, moves along the cam in the direction of the arrow 27 followed by a return to its original position along the arrow 28. This motion around the cam by the cam follower gives to the upper stripping arm the lateral motion necessary to strip the insulation from the severed end 13 of the wire.

In Fig. 6 a sectional view of the construction of the cam 22 and cam case 18 is shown. The cam follower 20 fastened to the holder arm 17 is shown in place.

In Figs. 7 and 8 is shown the reciprocating means by which the three arms 7, 8, and 29 are actuated. The three arms 7, 8, and 29, which carry respectively the upper notched knife 9, the lower notched knife 10, and the cutting knife 11, are attached to reciprocating levers, respectively 30, 31 and 32. Each of these arms is pivoted near its lower end on a shaft 33 and terminates below the pivot in a cam follower 34. Each lever is also connected to the frame of the machine by a spring 35 under tension. Only the spring on lever 30 is shown for simplicity. The tension of the springs tends to pull the levers, and hence the stripping and cutting arms toward the revolving drum on which the wire is being wound. The levers are moved away from the drum by the cam follower 34 as they follow the rotation of the cams 36 in the direction of the arrow 37. Only one cam is shown in Fig. 8, but there is one for each lever and cam follower. They are mounted on the same axis and are shaped such that their rotation forces the levers away from the wire as the cam follower contacts points of increasing radius. When the cam follower reaches the sudden decrease in radius 38, the lever and hence the respective cutting or stripping arm is released to strike the wire. The rotation of the cams is synchronized by proper gearing with the rotation of the drum. The shape of the cams and the respective position of the decreases in radius 38 is chosen to govern the motion of the respective arms in proper sequence.

The embodiment of my invention described in Fig. 2 is similar in operation. The main difference is that the needle 4 is operating from above the differently shaped drum 14 in a circular motion. The spindles 15 are mounted vertically on the top of the drum in such a way that the shuttle needle 4 can wind short lengths into loops on the spindles. The rest of the operation is similar to that of the embodiment of Fig. 1 except that the two stripping knives and the cutting knife are now in a horizontal plane instead of being spaced at different levels. This is so in order to permit them to engage the now horizontal strips of wire connecting the successive loops. In this embodiment the angle of the notched stripping knives in their holders is different because the wire presents itself at a different angle to the holder arms.

While the embodiments which I have described utilize the rotation of the drum to pull insulation through the lower notched knife 10, an obvious modification would be to put a cam and cam follower on the lower stripping arm 8, but in mirror image relationship to that in the upper arm 7. The both arms would then be used to strip the wire by lateral motions in the direction of the respective severed ends of the wire.

Variations in the shape and construction of various parts of the machine will be obvious to those skilled in the art. The rotating drum may be any rotating support for the spindles, provided a backing is provided against which the various reciprocating arms can strike. The means for support of the loops of wire may be spindles as shown, or any other type of fastening on which the wire can be easily wound. The knurling tool can be omitted or not, as the need for such a mechanism requires. When it is omitted, the cutting and stripping arms can be placed in the interval between the hank just being wound and the previous hank, that is, where the knurling tool is shown in the figures.

It is a great advantage of the described embodiment of my invention that it packages, cuts and strips the wire in one operation automatically. In no previous device were all these operations combined in one. The product as it is removed from the spindles is ready to be used for whatever uses are desired and is coiled in neat packages or coils, easy to handle and to store.

It is a further advantage of my invention that it is usable for multiplexed wires, that is, wires having more than one strand of conductor. The increasing use of such wires in many phases of manufacturing make this an important advantage.

It is another advantage of my invention that where it is necessary to achieve good bonding of one of the stripped ends with a casting, it is possible to use a knurling tool which achieves knurls or crimps in the wire without interfering with the stripping operation. Previously, it was necessary when such knurls were needed to apply them as an independent operation requiring another set of handlings.

It is another advantage of my invention that it is possible to obtain hanks of any length desired. This is done by adjusting the correlation of the intermittent rotation of the drum with the motions of the shuttle needle. Because of the limitations of size and space and the inherent characteristics of their motions, many of the prior art devices would not permit this flexibility and were limited in the length of wire which would be produced with its ends stripped of insulation.

It is another advantage of my invention that many of the operations found in machines of the prior art have been eliminated without the elimination of their functions.

This application is a continuation-in-part of my co-pending application, Serial No. 485,006, now abandoned, filed January 31, 1955.

I claim:

1. In a machine for severing segments of insulated wire which comprises a means for supporting said wire, reciprocating arms moving toward and away from said supported wire, and means for reciprocating said arms in synchronism with the motion of said support; the improvement which comprises, in combination a reciprocating arm terminating in a cutting knife, mounted to strike said wire; two reciprocating arms terminating in notched knife blades mounted to strike said wire on either side of said cutting knife, said notches being of sufficient size to fit around the wire used but small enough to cut the insulation on said wire; means for reciprocating said three arms such that the said notched knives strike the said wire before the said cutting knife, and means for imparting, subsequent to the severing of the wire by the said cutting arm, relative motion between said notched knives and the severed ends of said wire segments in a direction such that the said severed ends pass through said notched knives, at least one of said means for imparting relative motion between said notched knives and the said wire being a cam and cam follower imposing on the said reciprocating arms carrying said notched knife a detoured return to its reciprocation, imparting a lateral motion relative to said wire in the direction of the severed end of said wire.

2. The improvement of claim 1 in which only one arm bearing a notched knife has said detoored reciprocation and the other arms have linear reciprocation, there being means for imparting to the severed end of the said wire held in the second of said notched knives, sobsequent to the severing of said wire by said cutting knife, a motion pulling said wire through said notched knife such that the severed end of said wire is pulled through said notch.

3. In a machine for severing segments of insulated wire which comprises an intermittently rotating means for supporting said wire in coils connected by lengths of said wire, reciprocating arms moving toward and away from said connecting lengths of said wire, and means for reciprocating said arms in synchronism with the motion of said support; the improvement which comprises in combination a reciprocating arm terminating in a cutting knife mounted to strike said wire; two reciprocating arms terminating in notched knife blades mounted to strike said wire on either side of said cutting knife, said notches being of sufficient size to fit around the wire used, but small enough to cut the insulation on said wire; means for reciprocating said three arms such that the said notched knives strike the said wire before the said cutting knife, and means for imparting, subsequent to the severing of the wire by the said cutting arm, relative motion between said notched knives and the severed ends of said wire segments in a direction such that the said severed ends pass through said notched knives, at least one of said means for imparting relative motion between said notched knives and the said wire being a cam and cam follower imposing on the said reciprocating arms carrying the said notched knife a detoured return to its reciprocation, imparting a lateral motion relative to said wire in the direction of the severed end of said wire.

4. The improvement of claim 3 in which the arm bearing a notched knife which is on the side of the cutting knife from which the wire is being fed to the cutting and stripping mechanism has the said detoured reciprocation, the other arms having linear reciprocation, the said intermittent rotation of said supporting means imparting to the severed end of the said wire held in the second of said notched knives, subsequent to the severing of said wire by said cutting knife, a motion pulling said wire through said notched knife such that the severed end of said wire is pulled through said notch.

References Cited in the file of this patent

UNITED STATES PATENTS

| | | |
|---|---|---|
| 2,239,755 | Montgomery | Apr. 29, 1941 |
| 2,434,591 | Schaefer | Jan. 13, 1948 |
| 2,598,485 | Adams | May 27, 1952 |
| 2,680,394 | Andren | June 8, 1954 |
| 2,782,664 | Caldwell | Feb. 26, 1957 |